United States Patent

Kramer et al.

(10) Patent No.: US 9,290,609 B2
(45) Date of Patent: Mar. 22, 2016

(54) HARDENER FOR EPOXY RESINS

(75) Inventors: Andreas Kramer, Zurich (CH); Edis Kasemi, Zurich (DE)

(73) Assignee: SIKA TECHNOLOGY AG, Baar (CH)

( * ) Notice: Subject to any disclaimer, the term of this patent is extended or adjusted under 35 U.S.C. 154(b) by 19 days.

(21) Appl. No.: 14/129,363

(22) PCT Filed: Jul. 9, 2012

(86) PCT No.: PCT/EP2012/063375
§ 371 (c)(1),
(2), (4) Date: Dec. 26, 2013

(87) PCT Pub. No.: WO2013/010841
PCT Pub. Date: Jan. 24, 2013

(65) Prior Publication Data
US 2014/0128506 A1   May 8, 2014

(30) Foreign Application Priority Data
Jul. 15, 2011 (EP) .................................... 11174274

(51) Int. Cl.
*B05D 1/00* (2006.01)
*C08G 59/56* (2006.01)
*C08L 63/00* (2006.01)
*C09D 163/00* (2006.01)
*C09K 3/00* (2006.01)
*C08G 59/62* (2006.01)
*C08G 59/50* (2006.01)

(52) U.S. Cl.
CPC ............... *C08G 59/623* (2013.01); *B05D 1/00* (2013.01); *C08G 59/50* (2013.01); *C08G 59/5033* (2013.01); *C08G 59/56* (2013.01); *C08L 63/00* (2013.01); *C09D 163/00* (2013.01); *C09K 3/00* (2013.01)

(58) Field of Classification Search
None
See application file for complete search history.

(56) References Cited

U.S. PATENT DOCUMENTS

| | | |
|---|---|---|
| 4,129,556 A | 12/1978 | Zondler et al. |
| 4,369,290 A | 1/1983 | Evans et al. |
| 4,371,665 A | 2/1983 | Hino et al. |
| 4,399,268 A | 8/1983 | Becker et al. |
| 2002/0164485 A1 | 11/2002 | Martin |
| 2009/0163676 A1 | 6/2009 | Vedage et al. |

FOREIGN PATENT DOCUMENTS

| | | | |
|---|---|---|---|
| EP | 0 042 617 A1 | 12/1981 | |
| GB | 1309454 A | * 3/1973 | |

OTHER PUBLICATIONS

International Preliminary Report on Patentability issued in International Patent Application No. PCT/EP2012/063375 dated Jan. 21, 2014.
Anonymous: "2-(aminomethyl) phenol," *Chem Synthesis*, 1992, XP002664586 Retrieved from the Internet: [http://www.chemsynthesis.com/base/chemical-structure-30241.htm].
Anonymous: "Phenol, 2-[[(2-hydroxyethyl)amino]methyl]-," *LookChem*, 2008, XP002664587 Retrieved from the Internet: [http://www.lookchem.com/chemical-dictionary/de/product_o/4202-67-9].
Anonymous: "2-(-aminoethyl)phenol," *Chemical Book*, 2010, XP002664588 Retrieved from the Internet: [http:www/chemicalbook.com/ChemicalProductPropert_EN_CB21255759.htm].
International Search Report issued in International Patent Application No. PCT/EP2012/063375 dated Oct. 9, 2012.

* cited by examiner

*Primary Examiner* — Robert Sellers
(74) *Attorney, Agent, or Firm* — Oliff PLC

(57) ABSTRACT

The present invention concerns low-odor, low-viscosity hardeners for epoxy resins, including an amine with at least one amino group of formula (I) and an amine with at least one amino group of formula (II), wherein the amino groups of formulas (I) and (II) are present in a particular ratio.

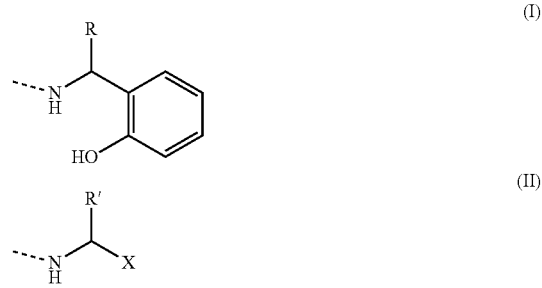

These hardeners harden quickly with epoxy resins and without blushing to form films of high hardness and good resistance. They are especially suitable for low-emission coatings.

14 Claims, No Drawings

HARDENER FOR EPOXY RESINS

TECHNICAL FIELD

The invention concerns the field of amines and their use as hardeners for epoxy resins, as well as amine-containing epoxy resin compositions and their use, especially as a coating

PRIOR ART

Epoxy resin compositions should have a number of properties in order to be useful as a high-quality coating. On the one hand, they should have a low viscosity, so that they are readily workable and self-running at ambient temperature, and they should harden quickly without any so-called blushing effects, even under damp cold conditions. By "blushing" is meant defects upon hardening such as turbidity, spots, and rough or sticky surface, typically caused by salt formation of amines with carbon dioxide ($CO_2$) in the air, with high humidity and low temperatures favoring the blushing effects. In the hardened state, the epoxy resin coating should have an even surface with no turbidity, spots or craters, and it should possess a good hardness and good resistance. To achieve these properties, thinners are normally used in epoxy resin coatings of the prior art. Such thinners, like benzyl alcohol or phenols, greatly improve the workability, but they are not incorporated into the resin matrix upon hardening. Yet the demand for low-emission systems that have a low content of substances which can be released by evaporation or diffusion processes after hardening is becoming increasingly important today. Therefore, thinners which cannot be incorporated can only be used in very slight amount or not at all in low-emission systems. Another possibility of thinning epoxy resin compositions is the adding of low-molecular amines, such as isophorone diamine, xylylene diamine or dimethylaminopropylamine. But such low-molecular amines usually have a strong odor and are very irritating to the skin, and they lead to blushing effects under damp, cold conditions.

US 2009/0163676 specifies hardener compositions containing at least one benzylated polyalkylene polyamine and at least one additional amine. Without adduct formation with epoxides, these hardeners harden only slowly with epoxy resins, especially in cold conditions. A partial adducting to epoxides brings about a faster curing, but the viscosity of the hardener is greatly increased by this.

U.S. Pat. No. 4,129,556 specifies epoxy resin compositions containing twice hydroxybenzylated diamines as hardener, which are preferably solid at room temperature. U.S. Pat. No. 4,399,268 specifies a process for making of epoxy resin molded articles or coatings in which singly hydroxybenzylated diamines are used as the hardener.

It is known from the prior art that phenol groups have an accelerating action on the curing of amines with epoxides. Phenol and alkylphenols are odor-intense, toxic, and therefore not desirable in compositions, and no low-emission systems can be formulated with non-incorporable thinners containing phenol groups. Mannich bases, in turn, are highly viscous and often contain traces of free phenol, and the hydroxybenzylated polyamines known from the prior art have such high viscosity that they are not suitable for coating applications without additional thinning.

PRESENTATION OF THE INVENTION

The problem of the present invention is therefore to provide hardeners for epoxy resins that are low-odor, low-viscosity, and readily workable and well compatible with epoxy resins, even without the presence of non-incorporable thinners, and which cure quickly even under damp, cold conditions and without blushing.

Surprisingly, it has been discovered that hardeners according to claim 1 comprising an amine with at least one amino group of formula (I) and an amine with at least one amino group of formula (II) in the specified ratio of amino groups solve these problems. The hardener is low-odor, low-volatile, and surprisingly low-viscosity. It can be readily mixed with epoxy resins and also enables a low viscosity in the mixed state. It is outstandingly compatible with epoxy resins and hardens them surprisingly fast, even under damp, cold conditions. This produces films that are not sticky, have a high luster, are free of turbidity and surface defects, and possess a high hardness and good resistance. Especially surprising is the fact that the hardener has only slightly increased viscosity as compared to hardeners without amino groups of formula (I), but hardens with epoxy resins much faster than they do, especially in the cold. But thus far the good properties of phenol groups could only be utilized in the prior art at the expense of the mentioned drawbacks. With hardeners of claim 1, low-emission epoxy resin systems are accessible that fulfill the conditions for the Eco Seal of Approval, such as Emicode (EC1 Plus), AgBB, DIBt, Der Blaue Engel, AFSSET, RTS (M1) and US Green Building Council (LEED), and at the same time satisfy high demands with regard to processing and service properties, which is not possible with hardeners of the prior art.

Further aspects of the invention are the subject matter of further independent claims. Especially preferred embodiments of the invention are the subject matter of the dependent claims.

WAYS OF IMPLEMENTING THE INVENTION

The subject matter of the invention is a hardener suitable for the hardening of epoxy resins, comprising an amine with at least one amino group of formula (I) and an amine with at least one amino group of formula (II),

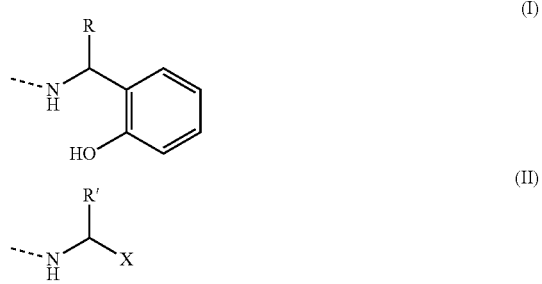

wherein R and R' independently of each other stand for a hydrogen atom or an alkyl group with 1 to 12 C atoms; and X stands for a hydrocarbon residue with 1 to 20 C atoms, which optionally has hydroxyl groups, ether groups, ester groups or amino groups; and wherein the ratio V1 between the number of amino groups of formula (I) and the number of amino groups of formula (II) in the hardener has a value of 0.05:1 to 1.0:1.

The dotted lines in the formulas in this document each represent the bond between a substituent and the corresponding molecular residue.

Substance names starting with "poly", such as polyamine, polyol or polyepoxide, designate substances that formally contain two or more of the functional groups appearing in their name in each molecule.

By "aliphatic" is meant an amine whose amino groups are bound to an aliphatic, cycloaliphatic or arylaliphatic residue; accordingly, these groups are termed aliphatic amino groups.

By "aromatic" is meant an amine whose amino groups are bound to an aromatic residue; accordingly, these groups are termed aromatic amino groups.

By "amine hydrogen" is meant the hydrogen atoms of primary and secondary amino groups.

By "non-incorporable thinner" is meant a substance that is soluble in an epoxy resin and that lowers its viscosity, which is not covalently incorporated into the resin matrix upon the hardening of the epoxy resin.

By "viscosity" is meant in the present document the dynamic viscosity or shear viscosity, which is defined by the ratio between the shear stress and the shear rate (velocity gradient) and determined as described in DIN EN ISO 3219.

Preferably the ratio V1 between the number of amino groups of formula (I) and the number of amino groups of formula (II) has a value of 0.08:1 to 0.7:1, especially preferably 0.1:1 to 0.5:1.

In the preferred ratio, the hardener has an advantageous combination of low viscosity and rapid hardening with epoxy resins.

Preferably R and R' independently of each other stand for a hydrogen atom or a methyl group, especially a hydrogen atom.

These amines have especially low viscosities.

Preferably, X stands for a hydrocarbon residue with 1 to 12 C atoms, which optionally has hydroxyl groups, ether groups or amino groups.

In an especially preferred embodiment, X stands for methyl, ethyl, propyl, isopropyl, isobutyl, pentyl, isopentyl, hexyl, cyclohexyl, hept-3-yl, nonyl, undecyl, phenyl, an isomeric toluyl, an isomeric dimethylphenyl, an isomeric trimethylphenyl or an isomeric naphthyl. These amines have especially low viscosities.

Very especially preferably X stands for a hydrocarbon residue in the form of an optionally substituted aryl residue with 5 to 12 C atoms, especially phenyl, the isomeric toluyls, the isomeric dimethylphenyls, the isomeric trimethylphenyls and the isomeric naphthyls. These amines have especially low viscosities and moreover they are especially compatible with epoxy resins, so that films cured with them have especially high quality.

Most preferably, X stands for phenyl. Amines with benzylamino groups as the amino groups of formula (II) have an especially low viscosity and harden with epoxy resins into films of very high quality in terms of clarity, luster, hardness and nontackiness.

In one embodiment, X stands for a residue of formula (III),

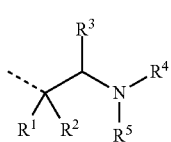

(III)

where
$R^1$ and $R^2$ stand, either
 independently of each other for a monovalent hydrocarbon residue with 1 to 12 C atoms,
 or together for a divalent hydrocarbon residue with 4 to 12 C atoms, which is part of an optionally substituted carbocyclic ring with 5 to 8, preferably 6, C atoms;
$R^3$ stands for hydrogen or an alkyl group or an arylalkyl group or an alkoxycarbonyl group with 1 to 12 C atoms;
and either
$R^4$ stands for a monovalent aliphatic, cycloaliphatic or arylaliphatic residue with 1 to 20 C atoms, which optionally contains heteroatoms, and
$R^5$ stands for hydrogen or for a monovalent aliphatic, cycloaliphatic or arylaliphatic residue with 1 to 20 C atoms, which optionally contains heteroatoms, or
$R^4$ and $R^5$ together stand for a divalent aliphatic residue with 3 to 30 C atoms, which is part of an optionally substituted heterocyclic ring with 5 to 8, preferably 6, ring atoms, wherein this ring optionally contains other heteroatoms besides the nitrogen atom.

Preferably $R^1$ and $R^2$ each time stand for a methyl group.
Preferably $R^3$ stands for a hydrogen atom.
Preferably $R^4$ stands for methyl, ethyl, propyl, isopropyl, butyl, 2-ethylhexyl, cyclohexyl, 2-hydroxyethyl, 2-methoxyethyl, 2-hydroxypropyl or benzyl; and $R^5$ stands for a hydrogen atom or for methyl, ethyl, propyl, isopropyl, butyl, 2-ethylhexyl, cyclohexyl, 2-hydroxyethyl, 2-methoxyethyl, 2-hydroxypropyl or benzyl.

Furthermore, $R^4$ and $R^5$ preferably form, with inclusion of the nitrogen atom, an optionally substituted morpholine ring.

Such hardeners containing amino groups of formula (II) are very compatible with epoxy resins, especially when they contain morpholine groups.

Preferably the residue of formula (III) has not more than 12 C atoms.

In another embodiment, X stands for a residue of formula (IV),

(IV)

where
$R^{1'}$ stands for $R^1$, $R^{2'}$ for $R^2$ and $R^{3'}$ for $R^3$, while $R^1$, $R^2$ and $R^3$ have the already mentioned meanings, and
$R^6$ stands for hydrogen or for an alkyl or acyl residue with 1 to 20 C atoms, especially for hydrogen or for an acyl residue with 1 to 12 C atoms.

Preferably, $R^6$ stands for hydrogen, methyl, ethyl, propyl, butyl, formyl, acetyl, propionyl, butanoyl, isobutanoyl, pentanoyl, hexanoyl, cyclohexanoyl, 2-ethyl-hexanoyl, octanoyl, decanoyl, dodecanoyl or benzoyl, especially preferably for hydrogen or for dodecanoyl.

Such hardeners containing amino groups of formula (II) are very compatible with epoxy resins, especially when they have hydrogen as $R^6$. With dodecanoyl as $R^6$ especially low-viscosity amines are available.

Preferably the residue of formula (IV) has not more than 12 C atoms.

Preferably the residue of formula (IV) contains hydroxyl groups or ether groups.

The amines contained in the described hardener with amino groups of formulas (I) or (II) preferably carry each time 1 to 3, especially 2, of these amino groups.

The described hardener can contain amines with amino groups of formula (II) with different residues X, especially with different residues X mentioned as being preferred.

The amines contained in the described hardener with amino groups of formulas (I) and (II) preferably do not constitute any amine-epoxy adducts.

The described hardener in a preferred embodiment contains at least one amine of formula (V),

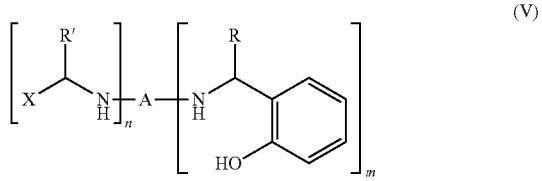

where

A stands for a (m+n)-valent hydrocarbon residue with a molecular weight in the range of 28 to 5000 g/mol, which optionally has ether groups or amino groups;

m and n each time stand for 1 or 2; and

R, R' and X have the mentioned meanings.

For the same ratio V1 a hardener containing at least one amine of formula (V) has a lower viscosity than a corresponding hardener which contains only a mixture of an amine with only amino groups of formula (I) and an amine with only amino groups of formula (II) and is free of amines of formula (V). Based on the lower viscosity, the presence of at least one amine of formula (V) is preferred in the hardener according to the invention.

Preferably, (m+n) in formula (V) stands for 2.

Preferably A in formula (V) stands for a (m+n)-valent hydrocarbon residue with a molecular weight in the range of 28 to 500 g/mol, which optionally has ether groups or amino groups.

Preferably A in formula (V) is free of primary amino groups.

The preferred amine of formula (V) is very compatible with epoxy resins and hardens very quickly with them, with no blushing effects, to form high-quality films.

Especially preferably, A in formula (V) stands for a residue of an amine after removal of the primary amino groups, wherein the amine is chosen from the group consisting of 1,5-diamino-2-methylpentane (MPMD), 2-butyl-2-ethyl-1,5-pentane diamine (C11-neodiamine), 1,6-hexane diamine, 2,5-dimethyl-1,6-hexane diamine, 2,2,4- and 2,4,4-trimethylhexamethylene diamine (TMD), 1,12-dodecane diamine, 1,4-diaminocyclohexane, bis-(4-aminocyclohexyl)methane ($H_{12}$-MDA), bis-(4-amino-3-methylcyclohexyl)methane, 1-amino-3-aminomethyl-3,5,5-trimethylcyclohexane (=isophorone diamine or IPDA), 1,3-bis-(aminomethyl)cyclohexane, 2,5(2,6)-bis-(aminomethyl)-bicyclo[2.2.1]heptane (NBDA), 3(4),8(9)-bis-(aminomethyl)-tricyclo[$5.2.1.0^{2,6}$] decane, 1,3-bis-(aminomethyl)benzene, bis-hexamethylene triamine (BHMT), diethylene triamine (DETA), triethylene tetramine (TETA), tetraethylene pentamine (TEPA), pentaethylene hexamine (PEHA), polyethylene polyamine with 5 to 7 ethylene amine units (so-called "higher ethylene polyamines", HEPA), dipropylene triamine (DPTA), N-(2-aminoethyl)-1,3-propane diamine (N3-Amin), N,N'-bis(3-aminopropyl)ethylene diamine (N4-amine) and polyoxyalkylene-diamines and polyoxyalkylene-triamines with a molecular weight of 200 to 500 g/mol. These especially preferred amines of formula (V) are especially compatible with epoxy resins and harden quickly without blushing effects into high-quality films.

In an especially preferred embodiment, A in formula (V) stands for the residue of MPMD or TMD or 1,3-bis-(aminomethyl)benzene after removal of two primary amino groups. These residues A yield very low-viscosity amines of formula (V) and thus cured compositions of high hardness.

In another very preferred embodiment, A in formula (V) stands for the residue of DETA, TETA, TEPA, PEHA, HEPA, DPTA, N3-amine and N4-amine after removal of the two primary amino groups. These residues A yield cured compositions of especially high hardness and good resistance.

In another very preferred embodiment, A in formula (V) stands for the residue of a polyoxyalkylene-diamine or polyoxyalkylene-triamine with a molecular weight of 200 to 500 g/mol, after removal of the primary amino groups. These preferred residues A yield very especially low-viscosity amines of formula (V).

Preferably, the hardener has a viscosity, measured at 20° C., in the range of 150 to 2000 mPa·s, especially preferably in the range of 150 to 1000 mPa·s, and particularly in the range of 150 to 700 mPa·s.

Amines with at least one amino group of formula (I) and amines with at least one amino group of formula (II) can be obtained especially advantageously by the reductive alkylation of primary amines with carbonyl compounds of formula (VI) or of formula (VII).

In formulas (VI) and (VII), R, R' and X have the already mentioned meanings.

An amine of formula (V) can be obtained especially advantageously by the reductive alkylation of a primary amine with a mixture containing at least one carbonyl compound of formula (VI) and at least one carbonyl compound of formula (VII).

Suitable as the carbonyl compound of formula (VI) are ketones, especially 2'-hydroxyacetophenone, as well as salicylic aldehyde (2-hydroxybenzaldehyde). Salicylic aldehyde is preferred.

Suitable as the carbonyl compound of formula (VII) in one embodiment are ketones and aldehydes in which X stands for an optionally substituted aryl residue. These are, in particular, benzaldehyde, the isomeric tolualdehydes, the isomeric dimethylbenzaldehydes, the isomeric trimethylbenzaldehydes, the isomeric naphthaldehydes, especially 1-naphthaldehyde, acetophenone, 4'-methylacetophenone, propiophenone and 4'-methylpropiophenone. Suitable as the carbonyl compound of formula (VII) in another embodiment are ketones and aldehydes in which X stands for an optionally substituted alkyl or cycloalkyl residue. These are, in particular, acetone, methylethylketone, methylpropylketone, methylisopropylketone, methylisobutylketone, methylpentylketone, methylisopentylketone, propanal, isobutanal, hexanal, cyclohexanal and 2-ethylhexanal.

Suitable as the carbonyl compound of formula (VII) in another embodiment are ketones and aldehydes in which X stands for a residue of formula (III). These are, in particular, 2,2-dimethyl-3-methylaminopropanal, 2,2-dimethyl-3-dimethylaminopropanal, 2,2-dimethyl-3-bis(2-methoxyethyl)aminopropanal, 2,2-dimethyl-3-benzylaminopropanal, 2,2-dimethyl-3-(N-benzylmethylamino)propanal, 2,2-dimethyl-3-(N-morpholino)propanal and 2,2-dimethyl-3-(N-(2,6-dimethyl)morpholino)propanal.

Suitable as the carbonyl compound of formula (VII) in another embodiment are ketones and aldehydes in which X stands for a residue of formula (IV). These are, in particular, 2,2-dimethyl-3-hydroxypropanal, 2,2-dimethyl-3-methoxypropanal, 2,2-dimethyl-3-ethoxypropanal, 2,2-dimethyl-3-propoxypropanal, 3-acetoxy-2,2-dimethylpropanal, 2,2-dimethyl-3-lauroyloxypropanal and 3-benzoyloxy-2,2-dimethylpropanal.

Preferably the carbonyl compound of formula (VII) is chosen from the group consisting of benzaldehyde, o-tolualdehyde, m-tolualdehyde, p-tolualdehyde, 2,4-dimethylbenzaldehyde, 3,4-dimethylbenzaldehyde, 2,4,5-trimethylbenzaldehyde, 2,4,6-trimethylbenzaldehyde, acetophenone, 2,2-dimethyl-3-(N-morpholino)propanal, 2,2-dimethyl-3-hydroxypropanal and 2,2-dimethyl-3-lauroyloxypropanal. Especially suitable as the carbonyl compound of formula (VII) are benzaldehyde and acetophenone, most preferred being benzaldehyde.

It is likewise possible to prepare amines with at least one amino group of formula (II) by using a mixture of different carbonyl compounds of formula (VII) during the reductive alkylation. It is also possible to prepare a hardener according to the invention by starting with mixtures containing at least one carbonyl compound of formula (VI) and several carbonyl compounds of formula (VII) by reductive alkylation.

Suitable as the starting amines for the reductive alkylation to obtain the described hardeners are amines of formula (VIII).

In formula (VIII), A, m and n have the already mentioned meanings.

The carbonyl compounds are used preferably stoichiometrically in relation to the primary amino groups of the amine of formula (VIII), obtaining amines with at least one amino group of formula (I) or amines with at least one amino group of formula (II) that are free of primary amino groups.

Preferable is a preparation method for an amine with at least one amino group of formula (I) and an amine with at least one amino group of formula (II), whose amino groups are present in the ratio V1, in a one-stage process. In this case, at least one amine of formula (VIII) is reductively alkylated with a mixture of at least one carbonyl compound of formula (VI) and at least one carbonyl compound of formula (VII), wherein the molar ratio between the carbonyl compound of formula (VI) and the carbonyl compound of formula (VII) is 0.05:1 to 1.0:1, preferably 0.08:1 to 0.7:1, especially 0.1:1 to 0.5:1, depending on the desired ratio V1. From this preparation method, a hardener can be obtained that has at least one amine of formula (V). Such a hardener has an especially low viscosity.

Also possible is a preparation method for an amine with at least one amino group of formula (I) and an amine with at least one amino group of formula (II), whose amino groups are present in the ratio V1, in a multi-stage process. In this case, in one stage at least one amine of formula (VIII) is reductively alkylated with at least one carbonyl compound of formula (VI), obtaining an amine with at least one amino group of formula (I). In a further stage, at least one amine of formula (VIII) can be reductively alkylated with at least one carbonyl compound of formula (VII), obtaining an amine with at least one amino group of formula (II). The obtained amines can then be mixed in such an amount that their amino groups of formulas (I) and (II) are in the ratio V1. Such a hardener typically has a somewhat higher viscosity than a corresponding hardener from the above described one-stage process.

The reductive alkylation is carried out preferably in presence of hydrogen and under elevated pressure. It can occur directly with molecular hydrogen or indirectly by hydrogen transfer from other reagents. Molecular hydrogen is used preferably. The conditions are advantageously chosen such that, on the one hand, the primary amino groups are reductively alkylated as completely as possible and, on the other hand, no other components of the amine and the carbonyl compound are hydrogenated or decomposed if possible. One works preferably at a hydrogen pressure of 5 to 100 bar, a temperature of 40 to 120° C., and in presence of a suitable catalyst. Preferable as the catalyst are palladium on carbon (Pd/C), platinum on carbon (Pt/C), Adams catalyst and Raney nickel, especially palladium on carbon and platinum on carbon.

Suitable as the amine of formula (VIII) in a first embodiment are primary aliphatic polyamines which are known to be hardeners for epoxy resins, especially the following ones:

aliphatic, cycloaliphatic or arylaliphatic primary diamines, such as ethylene diamine, 1,2-propane diamine, 1,3-propane diamine, 2-methyl-1,2-propane diamine, 2,2-dimethyl-1,3-propane diamine, 1,3-butane diamine, 1,4-butane diamine, 1,3-pentane diamine (DAMP), 1,5-pentane diamine, 1,5-diamino-2-methylpentane (MPMD), 2-butyl-2-ethyl-1,5-pentane diamine (C11-Neodiamine), 1,6-hexane diamine, 2,5-dimethyl-1,6-hexane diamine, 2,2,4- and 2,4,4-trimethylhexamethylene diamine (TMD), 1,7-heptane diamine, 1,8-octane diamine, 1,9-nonane diamine, 1,10-decane diamine, 1,11-undecane diamine, 1,12-dodecane diamine, 1,2-, 1,3- and 1,4-diaminocyclohexane, bis-(4-aminocyclohexyl)methane ($H_{12}$-MDA), bis-(4-amino-3-methylcyclohexyl)methane, bis-(4-amino-3-ethylcyclohexyl)methane, bis-(4-amino-3,5-dimethylcyclohexyl)methane, bis-(4-amino-3-ethyl-5-methylcyclohexyl)methane (M-MECA), 1-amino-3-aminomethyl-3,5,5-trimethylcyclohexane (=isophorone diamine or IPDA), 2- and 4-methyl-1,3-diaminocyclohexane and mixtures thereof, 1,3- and 1,4-bis-(amino-methyl)cyclohexane, 2,5(2,6)-bis-(aminomethyl)bicyclo[2.2.1]heptane (NBDA), 3(4), 8(9)-bis-(aminomethyl)tricyclo[5.2.1.0$^{2,6}$]decane, 1,4-diamino-2,2,6-trimethylcyclohexane (TMCDA), 1,8-menthane diamine, 3,9-bis-(3-aminopropyl)-2,4,8,10-tetraoxaspiro[5.5]undecane as well as 1,3- and 1,4-bis-(aminomethyl)-benzene;

aliphatic, cycloaliphatic or arylaliphatic primary triamines like 4-aminomethyl-1,8-octane diamine, 1,3,5-tris-(aminomethyl)benzene, 1,3,5-tris-(aminomethyl)cyclohexane, tris-(2-aminoethyl)amine, tris-(2-aminopropyl)amine and tris-(3-aminopropyl)amine;

aliphatic primary diamines containing ether groups, such as especially bis-(2-aminoethyl)ether, 3,6-dioxaoctane-1,8-diamine, 4,7-dioxadecane-1,10-diamine, 4,7-dioxadecane-2,9-diamine, 4,9-dioxadodecane-1,12-diamine, 5,8-dioxadodecane-3,10-diamine, 4,7,10-trioxatridecane-1,13-diamine and higher oligomers of these diamines, bis-(3-aminopropyl)polytetrahydrofurans and other poly-tetrahydrofuran diamines, as well as polyoxyalkylene diamines. The latter typically constitute products from the amination of polyoxyalkylene diols and are available for example under the names Jeffamine® (from Huntsman), under the name Polyetheramine (from BASF) or under the name PC Amine® (from Nitroil). Especially suitable polyoxyalkylene diamines are Jeffamine® D-230, Jeffamine® D-400, Jeffamine® D-2000, Jeffamine® D-4000, Jeffamine® XTJ-511, Jeffamine® ED-600, Jeffamine® ED-900, Jeffamine® ED-2003, Jeffamine® XTJ-568, Jeffamine® XTJ-569, Jeffamine® XTJ-523, Jeffamine® XTJ-536, Jeffamine® XTJ-542, Jeffamine® XTJ-559, Jeffamine® EDR-104, Jeffamine® EDR-148, Jeffamine® EDR-176; Polyetheramine D 230, Polyetheramine D 400 and Polyetheramine D 2000, PC Amine® DA 250, PC Amine® DA 400, PC Amine® DA 650 and PC Amine® DA 2000;

primary polyoxyalkylene triamines, which typically constitute products from the amination of polyoxyalkylene triols and are available for example under the name Jeffamine® (from Huntsman), under the name polyetheramine (from BASF) or under the name PC Amine® (from Nitroil), such as in particular Jeffamine® T-403, Jeffamine® T-3000, Jeffamine® T-5000, Polyetheramine T 403, Polyetheramine T 5000 and PC Amine® TA 403;

polyamines having tertiary amino groups with two primary aliphatic amino groups, such as in particular N,N'-bis-(aminopropyl)-piperazine, N,N-bis-(3-aminopropyl) methylamine, N,N-bis-(3-aminopropyl)ethylamine, N,N-bis-(3-aminopropyl)propylamine, N,N-bis-(3-aminopropyl)cyclohexylamine, N,N-bis-(3-aminopropyl)-2-ethyl-hexylamine, as well as the products from the double cyanoethylation and subsequent reduction of fatty amines, which are derived from natural fatty acids, such as N,N-bis-(3-aminopropyl)dodecylamine and N,N-bis-(3-aminopropyl) tallow-alkylamine, available as Triameen® Y12D and Triameen® YT (from Akzo Nobel);

polyamines having tertiary amino groups with three primary aliphatic amino groups, such as in particular tris-(2-aminoethyl)amine, tris-(2-aminopropyl)amine and tris-(3-aminopropyl)amine;

polyamines having secondary amino groups with two primary aliphatic amino groups, such as in particular 3-(2-aminoethyl)aminopropylamine, bis-hexamethylene triamine (BHMT), diethylene triamine (DETA), triethylene tetramine (TETA), tetraethylene pentamine (TEPA), pentaethylene hexamine (PEHA) and higher homologues of linear polyethylene amines like polyethylene polyamine with 5 to 7 ethylene amine units (so-called "higher ethylene polyamines", HEPA), products from the multiple cyanoethylation or cyanobutylation and subsequent hydrogenation of primary di- and polyamines with at least two primary amino groups, such as dipropylene triamine (DPTA), N-(2-aminoethyl)-1,3-propane diamine (N3-amine), N,N'-bis(3-aminopropyl)ethylene diamine (N4-amine), N,N'-bis-(3-aminopropyl)-1,4-diaminobutane, N5-(3-aminopropyl)-2-methyl-1,5-pentane diamine, N3-(3-aminopentyl)-1,3-pentane diamine, N5-(3-amino-1-ethylpropyl)-2-methyl-1,5-pentane diamine and N,N'-bis-(3-amino-1-ethylpropyl)-2-methyl-1,5-pentane diamine.

Suitable as the amine of formula (VIII) in another embodiment are amines with only one primary aliphatic amino group, especially the following:

polyamines having primary and secondary amino groups, such as in particular N-methyl-1,2-ethane diamine, N-ethyl-1,2-ethane diamine, N-butyl-1,2-ethane diamine, N-hexyl-1,2-ethane diamine, N-(2-ethylhexyl)-1,2-ethane diamine, N-cyclohexyl-1,2-ethane diamine, 4-aminomethyl-piperidine, N-(2-aminoethyl) piperazine, N-methyl-1,3-propane diamine, N-butyl-1, 3-propane diamine, N-(2-ethylhexyl)-1,3-propane diamine, N-cyclohexyl-1,3-propane diamine, 3-methylamino-1-pentylamine, 3-ethylamino-1-pentylamine, 3-cyclohexylamino-1-pentylamine, fatty diamines like N-cocoalkyl-1,3-propane diamine and products from the Michael-type addition reaction of primary aliphatic diamines with acrylonitrile, maleic or fumaric acid diesters, citraconic acid diesters, acrylic and methacrylic acid esters, acrylic and methacrylic acid amides and itaconic acid diesters, reacted in a molar ratio of 1:1;

aminoalcohols, especially like 3-amino-1-propanol, 2-amino-1-butanol, 6-amino-1-hexanol, aminopropyldiethanol amine (APDEA), 4-(2-aminoethyl)-2-hydroxyethylbenzene, 3-aminomethyl-3,5,5-trimethylcyclohexanol, 2-(2-aminoethoxy)-ethanol, 2-(2-(2-aminoethoxy)ethoxy)ethanol, 3-(2-hydroxyethoxy)-propylamines and 3-(2-(2-hydroxyethoxy)-ethoxy)-propylamines;

aminomercaptans, especially like 2-aminoethane thiol (cysteamine), 3-aminopropane thiol, 4-amino-1-butane thiol and 6-amino-1-hexane thiol.

Preferred as the amine of formula (VIII) are polyamines with two or three primary aliphatic amino groups and a molecular weight up to 500 g/mol.

Especially preferably, the amine of formula (VIII) is chosen from the group consisting of MPMD, C11-neodiamine, 1,6-hexane diamine, 2,5-dimethyl-1,6-hexane diamine, TMD, 1,12-dodecane diamine, 1,4-diaminocyclohexane, $H_{12}$-MDA, bis-(4-amino-3-methylcyclohexyl)-methane, isophorone diamine, 1,3-bis-(aminomethyl)cyclohexane, NBDA, 3(4),8(9)-bis-(aminomethyl)-tricyclo[$5.2.1.0^{2,6}$]decane, 1,3-bis-(aminomethyl)benzene, BHMT, DETA, TETA, TEPA, PEHA, HEPA, DPTA, N3-amine, N4-amine, polyoxyalkylene-diamines and polyoxyalkylene-triamines with a molecular weight of 200 to 500 g/mol, especially the commercial types Jeffamine® D-230, Jeffamine® D-400 and Jeffamine® T-403 (from Huntsman).

The production of amines with at least one amino group of formula (I) and amines with at least one amino group of formula (II) by reductive alkylation in the described manner is especially advantageous for the use as hardeners for epoxy resins, since primary amino groups are alkylated very selectively, while secondary amino groups are hardly alkylated any further. The products of the described preparation can therefore be used after the reductive alkylation with no further processing for the hardening of epoxy resins in the described manner.

Amines with at least one amino group of formula (I) and amines with at least one amino group of formula (II) can also be obtained in ways other than reductive alkylation, especially by reaction of primary amines with corresponding chlorides or bromides in a suitable ratio. This produces reaction mixtures which typically have a substantial fraction of double alkylated amino groups.

The described hardener has especially advantageous properties. It is slightly volatile and low-odor and has so little reactivity with respect to $CO_2$ that it has no tendency in air either to form a crust or to precipitation or increased viscosity—unlike many amines of the prior art. Its viscosity is surprisingly low, despite the presence of phenol groups. The hardener is very compatible and workable with the usual commercial epoxy resins and it hardens surprisingly fast at ambient temperature with no troublesome blushing effects into cured compositions of high hardness and good resistance. For the ratio V1 between amino groups of formula (I) and amino groups of formula (II), on the one hand the hardening with epoxy resins is surprisingly fast, and on the other hand the viscosity of the hardener is surprisingly low.

The preferred hardener containing at least one amine of formula (V) surprisingly has an especially low viscosity and is therefore very especially suitable for low-emission epoxy resin systems with the Eco Seal of Quality, as already described.

The described hardener can contain other compounds suitable for the curing of epoxy resins, especially the following:

monoamines, like in particular benzylamine, cyclohexylamine, 2-phenylethylamine, 2-methoxyphenylethylamine, 4-methoxyphenylethylamine, 3,4-dimethoxyphenylethylamine (homoveratryl amine), 1- and 2-butylamine, isobutylamine, tert.-butylamine, 3-methyl-2-butylamine, 1-hexylamine, 1-octylamine, 2-ethyl-1-hexylamine, 2-methoxy-1-ethylamine, 2-ethoxy-1-ethylamine, 3-methoxy-1-propylamine, 3-ethoxy-1-propylamine, 3-(2-ethylhexyloxy)propylamine, 3-(2-methoxyethoxy)propylamine;

the previously described amines of formula (VIII);

secondary aliphatic polyamines, such as in particular N,N'-dibutyl-ethylene diamine, N,N'-di-tert.butyl-ethylene diamine, N,N'-diethyl-1,6-hexane diamine, 1-(1-methylethyl-amino)-3-(1-methylethyl-aminomethyl)-3,5,5-trimethylcyclohexane (Jefflink® 754 from Huntsman), $N^4$-cyclohexyl-2-methyl-$N^2$-(2-methylpropyl)-2,4-pentane diamine, N,N'-dialkyl-1,3-xylylene diamine, bis-(4-(N-3-butylamino)-cyclohexyl)-methane (Clearlink® 1000 from UOP), N-alkylated polyetheramines, such as the Jeffamine® types SD-231, SD-401, ST-404 and SD-2001 (from Huntsman), products from the Michael-type addition reaction of primary aliphatic polyamines with Michael acceptors like acrylonitrile, maleic acid diesters, fumaric acid diesters, citraconic acid diesters, acrylic acid esters, methacrylic acid esters, cinnamic acid esters, itaconic acid diesters, vinylphosphonic acid diesters, vinylsulfonic acid aryl esters, vinylsulfones, vinylnitriles, 1-nitroethylene or Knoevenagel condensation products such as those from malonic acid diesters and aldehydes like formaldehyde, acetaldehyde or benzaldehyde, and also commercial secondary aliphatic polyamines such as Gaskamine® 240 (from Mitsubishi Gas Chemical);

aromatic polyamines, especially such as m- and p-phenylene diamine, 4,4'-, 2,4' and 2,2'-diaminodiphenylmethane, 3,3'-dichloro-4,4'-diaminodiphenylmethane (MOCA), 2,4- and 2,6-toluylene diamine, mixtures of 3,5-dimethylthio-2,4- and -2,6-toluylene diamine (available as Ethacure® 300 from Albemarle), mixtures of 3,5-diethyl-2,4- and -2,6-toluylene diamine (DETDA), 3,3',5,5'-tetraethyl-4,4'-diaminodiphenylmethane (M-DEA), 3,3',5,5'-tetraethyl-2,2'-dichloro-4,4'-diaminodiphenylmethane (M-CDEA), 3,3'-diisopropyl-5,5'-dimethyl-4,4'-diaminodiphenylmethane (M-MIPA), 3,3',5,5'-tetraisopropyl-4,4'-diaminodiphenylmethane (M-DIPA), 4,4'-diaminodiphenylsulfone (DDS), 4-amino-N-(4-aminophenyl)benzene sulfonamide, 5,5'-methylene dianthranilic acid, dimethyl-(5,5'-methylene dianthranilate), 1,3-propylene-bis-(4-aminobenzoate), 1,4-butylene-bis-(4-aminobenzoate), polytetramethylene oxide-bis-(4-aminobenzoate) (available as Versalink® from Air Products), 1,2-bis-(2-aminophenylthio)ethane, 2-methylpropyl-(4-chloro-3,5-diaminobenzoate) and tert.butyl-(4-chloro-3,5-diaminobenzoate);

amine/epoxide adducts, especially adducts of the mentioned amines with diepoxides in a molar ratio of at least 2/1, especially in a molar ratio of 2/1 to 6/1, and reaction products from amines and epichlorhydrin, especially that of 1,3-bis-(aminomethyl)benzene, commercially available as Gaskamine® 328 (from Mitsubishi Gas Chemical);

polyamidoamines, which constitute reaction products of a monovalent or polyvalent carboxylic acid, or its esters or anhydrides, especially a dimer fatty acid, and an aliphatic, cycloaliphatic or aromatic polyamine used in stoichiometric excess, especially a polyalkylene amine such as DETA or TETA, especially the commercially available polyamidoamines Versamid® 100, 125, 140 and 150 (from Cognis), Aradur® 223, 250 and 848 (from Huntsman), Euretek® 3607 and 530 (from Huntsman) and Beckopox® EH 651, EH 654, EH 655, EH 661 and EH 663 (from Cytec);

Mannich bases, also sometimes known as phenalkamines, which constitute reaction products of a Mannich reaction of phenols, especially cardanol, nonylphenol or tert. butylphenol, with aldehydes, especially formaldehyde, and polyamines, especially the commercially available Mannich bases Cardolite® NC-541, NC-557, NC-558, NC-566, Lite 2001 and Lite 2002 (from Cardolite), Aradur® 3440, 3441, 3442 and 3460 (from Huntsman) and Beckopox® EH 614, EH 621, EH 624, EH 628 and EH 629 (from Cytec);

liquid mercaptan-terminated polysulfide polymers, known under the brand names Thiokol® (from Morton Thiokol; for example available from SPI Supplies, or from Toray Fine Chemicals), especially the types LP-3, LP-33, LP-980, LP-23, LP-55, LP-56, LP-12, LP-31, LP-32 and LP-2; as well as those known under the brand names Thioplast® (from Akzo Nobel), especially the types G 10, G 112, G 131, G 1, G 12, G 21, G 22, G 44 and G 4;

mercaptan-terminated polyoxyalkylene ethers, available for example by reaction of polyoxyalkylene di- and triols either with epichlorhydrin or with an alkylene oxide, followed by sodium hydrogen sulfide;

mercaptan-terminated compounds in the form of polyoxyalkylene derivatives, known under the brand names Capcure® (from Cognis), especially the types WR-8, LOF and 3-800;

polyesters of thiocarboxylic acids, such as pentaerythritol tetramercaptoacetate, trimethylol propane trimercaptoacetate, glycol dimercaptoacetate, pentaerythritoltetra-(3-mercaptopropionate), trimethylol propane tri-(3-mercaptopropionate) and glycol di-(3-mercaptopropionate), as well as the esterification products of polyoxyalkylene diols and triols, ethoxylated trimethylol propane and polyester diols with thiocarboxylic acids like thioglycolic acid and 2- or 3-mercaptopropionic acid;

other compounds having mercapto groups, such as in particular 2,4,6-trimercapto-1,3,5-triazine, 2,2'-(ethylene dioxy)-diethane thiol (triethylene glycol dimercaptan) and ethane dithiol.

Preferred among these are DAMP, MPMD, C11-neodiamine, 1,6-hexane diamine, 2,5-dimethyl-1,6-hexane diamine, TMD, 1,12-dodecane diamine, 1,4-diaminocyclohexane, $H_{12}$-MDA, bis-(4-amino-3-methylcyclohexyl)methane, IPDA, 3(4),8(9)-bis-(aminomethyl)-tricyclo[$5.2.1.0^{2,6}$] decane, 1,3-bis-(aminomethyl)benzene, 1,3-bis-(aminomethyl)cyclohexane, Gaskamine® 240, NBDA, polyoxyalkylene-diamins and triamines with a molecular weight in the range of 200 to 500 g/mol, especially the types Jeffamine® D-230, Jeffamine® D-400 and Jeffamine® T-403, amine/epoxy adducts, especially Gaskamine® 328.

The hardener according to the invention can also comprise at least one accelerator. Suitable as the accelerator are substances which accelerate the reaction between amino groups and epoxy groups, especially acids or compounds which can be hydrolyzed to acids, especially organic carboxylic acids like acetic acid, benzoic acid, salicylic acid, 2-nitrobenzoic acid, lactic acid, organic sulfonic acids like methane sulfonic acid, p-toluene sulfonic acid or 4-dodecylbenzene sulfonic acid, sulfonic acid esters, other organic or inorganic acids like in particular phosphoric acid, or mixtures of the aforementioned acids and acid esters; furthermore tertiary amines like in particular 1,4-diazabicyclo[2.2.2]octane, benzyldimethylamine, α-methylbenzyldimethylamine, triethanol amine, dimethylaminopropylamine, imidazoles like in particular N-methylimidazole, N-vinylimidazole or 1,2-dimethylimidazole, salts of such tertiary amines, quaternary ammonium salts, like in particular benzyltrimethylammonium chloride, amidines like in particular 1,8-diazabicyclo[5.4.0]undec-7-ene, guanidines like in particular 1,1,3,3-tetramethylguanidine, phenols, especially bisphenols, phenol resins and Mannich bases like in particular 2-(dimethylaminomethyl) phenol, 2,4,6-tris-(dimethylamino-methyl)phenol and polymers of phenol, formaldehyde and N,N-dimethyl-1,3-propane diamine, phosphites like in particular di- and triphenyl phosphites, as well as compounds having mercapto groups, such as have already been mentioned above Preferred accelerators are salicylic acid and 2,4,6-tris-(dimethylaminomethyl)phenol.

The hardener according to the invention can furthermore comprise at least one non-incorporable thinner, such as in particular xylene, 2-methoxyethanol, dimethoxyethanol, 2-ethoxyethanol, 2-propoxyethanol, 2-isopropoxyethanol, 2-butoxyethanol, 2-phenoxyethanol, 2-benzyloxyethanol, benzyl alcohol, ethylene glycol, ethylene glycol dimethyl ether, ethylene glycol diethyl ether, ethylene glycol dibutyl ether, ethylene glycol diphenyl ether, diethylene glycol, diethylene glycol monomethyl ether, diethylene glycol monoethyl ether, diethylene glycol mono-n-butyl ether, diethylene glycol dimethyl ether, diethylene glycol diethylether, diethylene glycol di-n-butylyl ether, propylene glycol butyl ether, propylene glycol phenyl ether, dipropylene glycol, dipropylene glycol monomethyl ether, dipropylene glycol dimethyl ether, dipropylene glycol di-n-butyl ether, N-methyl pyrrolidone, diphenyl methane, diisopropyl naphthaline, petroleum fractions such as Solvesso® types (from Exxon), alkyl phenols like tert.butyl phenol, nonyl phenol, dodecyl phenol and 8,11,14-pentadecatrienyl phenol (Cardanol, from cashew shell oil, available for example as Cardolite NC-700 from Cardolite Corp., USA), styrolized phenol, bisphenols, aromatic hydrocarbon resins, especially types containing phenol groups, adipates, sebacates, phthalates, benzoates, organic phosphoric and sulfonic acid esters and sulfonamides. Preferred are benzyl alcohol, dodecyl phenol, tert.butyl phenol, styrolized phenol and aromatic hydrocarbon resins containing phenol groups, especially Novares® types LS 500, LX 200, LA 300 and LA 700 (from Rütgers).

Preferably the hardener contains little or no content of non-incorporable thinners, especially preferably less than 25 wt. %, particularly less than 15 wt. %, and most preferably less than 5 wt. %. In particular, no non-incorporable thinner is added to the hardener.

Another subject matter of the invention is an epoxy resin composition containing
a) at least one epoxy resin, and
b) at least one hardener as described above.

As the epoxy resin, conventional technical epoxy resins are suitable. These are obtained in the known manner, for example, from the oxidation of the corresponding olefins or from the reaction of epichlorhydrin with the corresponding polyols, polyphenols or amines.

Especially suitable as the epoxy resin are so-called polyepoxide liquid resins, hereinafter called "liquid resin". These have a glass transition temperature which usually lies below 25° C., in contrast with so-called solid resins, which have a glass transition temperature above 25° C. and can be comminuted into powders which are pourable up to 25° C.

In one embodiment, the liquid resin is an aromatic polyepoxide. Suitable for this, for example, are liquid resins of formula (IX),

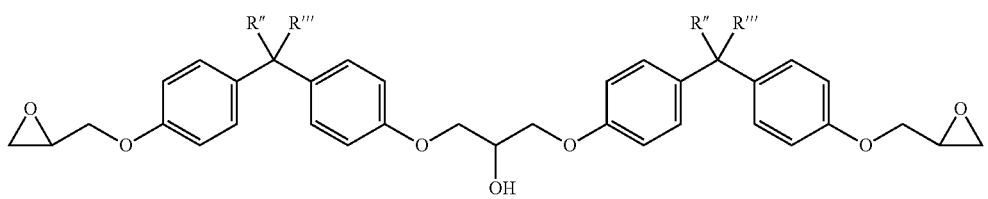

(IX)

where R" and R'" independently of one another each stand for a hydrogen atom or a methyl group, and s on average stands for a value of 0 to 1. Preferable are such liquid resins of formula (IX) for which the index s on average stands for a value of less than 0.2.

The liquid resins of formula (IX) are diglycidyl ethers of bisphenol-A, bisphenol-F and bisphenol-A/F, where A stands for acetone and F for formaldehyde, which serve as educts for the production of these bisphenols. A bisphenol-A liquid resin accordingly has methyl groups, a bisphenol-F liquid resin hydrogen atoms, and a bisphenol-A/F liquid resin both methyl groups and hydrogen atoms as R" and R'" in formula (IX). In the case of bisphenol-F, positional isomers can also be present, especially those derived from 2,4'- and 2,2'-hydroxyphenylmethane.

Other suitable aromatic liquid resins are the glycidylization products of
dihydroxybenzene derivatives such as resorcin, hydroquinone and pyrocatechol;
other bisphenols or polyphenols like bis-(4-hydroxy-3-methylphenyl)-methane, 2,2-bis-(4-hydroxy-3-methylphenyl)-propane (bisphenol-C), bis-(3,5-dimethyl-4- hydroxyphenyl)-methane, 2,2-bis-(3,5-dimethyl-4-hydroxyphenyl)-propane, 2,2-bis-(3,5-dibromo-4-hydroxyphenyl)-propane, 2,2-bis-(4-hydroxy-3-tert.-butylphenyl)-propane, 2,2-bis-(4-hydroxyphenyl)-butane (bisphenol-B), 3,3-bis-(4-hydroxyphenyl)-pentane, 3,4-bis-(4-hydroxyphenyl)-hexane, 4,4-bis-(4-hydroxyphenyl)-heptane, 2,4-bis-(4-hydroxyphenyl)-2-methylbutane, 2,4-bis-(3,5-dimethyl-4-hydroxyphenyl)-2-methylbutane, 1,1-bis-(4-hydroxyphenyl)-cyclohexane (bisphenol-Z), 1,1-bis-(4-hydroxyphenyl)-3,3,5-trimethylcyclohexane (bisphenol-TMC), 1,1-bis-(4-hydroxyphenyl)-1-phenylethane, 1,4-bis[2-(4-hydroxyphenyl)-2-propyl]-benzene) (bisphenol-P), 1,3-bis-[2-(4-hydroxyphenyl)-2-propyl]-benzene) (bisphenol-M), 4,4'-dihydroxydiphenyl (DOD), 4,4'-dihydroxybenzophenone, bis-(2-hydroxynaphth-1-yl)-methane, bis-(4-hydroxynaphth-1-yl)-methane 1,5-dihydroxy-naphthaline, tris-(4-hydroxyphenyl)-methane, 1,1,2,2-tetrakis-(4-hydroxyphenyl)-ethane, bis-(4-hydroxyphenyl)-ether, bis-(4-hydroxyphenyl) sulfone;

condensation products of phenols with formaldehyde, which are obtained under acidic conditions, such as phenol Novolaks or cresol Novolaks, also known as bisphenol-F Novolaks;

aromatic amines, like aniline, toluidine, 4-aminophenol, 4,4'-methylene diphenyldiamine (MDA), 4,4'-methylene diphenyldi-(N-methyl)-amine, 4,4'-[1,4-phenylene-bis-(1-methyl-ethylidene)]-bisaniline (bisaniline-P), 4,4'-[1,3-phenylene-bis-(1-methyl-ethylidene)]-bisaniline (bisaniline-M).

Also suitable as the epoxy resin is an aliphatic or cycloaliphatic polyepoxide, such as a glycidyl ether of a saturated or unsaturated, branched or unbranched, cyclical or open-chain $C_2$- to $C_{30}$-diol, such as ethylene glycol, propylene glycol, butylene glycol, hexane diol, octane diol, a polypropylene glycol, dimethylol cyclohexane, neopentylglycol or dibromo-neopentylglycol;

a glycidyl ether of a tri- or tetrafunctional, saturated or unsaturated, branched or unbranched, cyclical or open-chain polyol, such as ricin oil, trimethylol propane, trimethylol ethane, pentaerythrol, sorbitol or glycerine, as well as alkoxylated glycerine or alkoxylated trimethylol propane;

a hydrogenated bisphenol-A, -F or -A/F liquid resin, or the glycidylization products of hydrogenated bisphenol-A, -F or -A/F;

a N-glycidyl derivative of amides or heterocyclical nitrogen bases, such as triglycidyl cyanurate and triglycidyl isocyanurate, as well as reaction products of epichlorhydrin and hydantoin.

Also possible as the epoxy resin are a bisphenol-A, -F or -A/F solid resin, which is of similar structure to the already mentioned liquid resins of formula (V), but having a value of 2 to 12 instead of the index s, and having a glass transition temperature above 25° C.

Finally, also suitable as the epoxy resin are epoxy resins from the oxidation of olefins, such as from the oxidation of vinylcyclohexene, dicyclopentadiene, cyclohexadiene, cyclododecadiene, cyclododecatriene, isoprene, 1,5-hexadiene, butadiene, polybutadiene or divinylbenzene.

Preferred as the epoxy resin are liquid resins based on a bisphenol, especially based on bisphenol-A, bisphenol-F or bisphenol-A/F, as are commercially available, for example, from Dow, Huntsman and Hexion. These liquid resins have a low viscosity for epoxy resins and good properties as coatings in the hardened state. They can optionally be present in combination with bisphenol A solid resin or bisphenol-F Novolak epoxy resin.

The epoxy resin can contain a reactive thinner, especially a reactive thinner having at least one epoxy group. Suitable as the reactive thinner are, for example, the glycidylether of monovalent or polyvalent phenols and aliphatic or cycloaliphatic alcohols, such as in particular the already mentioned polyglycidyl ethers of di- or polyols, and also in particular phenylglycidyl ether, cresylglycidyl ether, p-n-butyl-phenylglycidyl ether, p-tert.butyl-phenylglycidyl ether, nonylphenylglycidyl ether, allylglycidyl ether, butylglycidyl ether, hexylglycidyl ether, 2-ethylhexylglycidyl ether, as well as glycidyl ether of natural alcohols, such as $C_8$- to $C_{10}$-alkylglycidyl ether or $C_{12}$- to $C_{14}$-alkylglycidyl ether. The adding of a reactive thinner to the epoxy resin brings about a reduction of the viscosity, and also—in the hardened state of the epoxy resin composition—a reduction of the glass transition temperature and the mechanical values.

Optionally the epoxy resin composition contains other components, especially adjuvants and additives normally used in epoxy resin compositions, such as the following:

solvents, thinners, film forming aids or extenders, such as the already mentioned non-incorporable thinners;

reactive thinners, especially reactive thinners having epoxy groups, such as have been previously mentioned, epoxidated soy oil or linseed oil, compounds having acetoacetate groups, especially acetoacetylated polyols, butyrolactone, carbonates, aldehydes, and also isocyanates and silicones having reactive groups;

polymers, such as polyamides, polysulfides, polyvinylformal (PVF), polyvinylbutyral (PVB), polyurethanes (PUR), polymers with carboxyl groups, polyamides, butadiene-acrylonitrile copolymers, styrene-acrylonitrile copolymers, butadiene-styrene copolymers, homo- or copolymers of unsaturated monomers, especially from the group comprising ethylene, propylene, butylene, isobutylene, isoprene, vinylacetate and alkyl (meth)acrylates, especially chlorosulfonated polyethylenes and fluorine-containing polymers, sulfonamide-modified melamines and purified Montan waxes;

inorganic and organic fillers, such as ground or precipitated calcium carbonates, which are optionally coated with fatty acids, especially stearates, barite (heavy spar), talcs, ground quartz, quartz sand, micaceous iron ore, dolomites, wollastonites, kaolins, mica (potassium aluminum silicate), molecular sieves, aluminum oxides, aluminum hydroxides, magnesium hydroxide, silicic acids, cements, gypsum, fly ash, soot, graphite, metal powder such as aluminum, copper, iron, zinc, silver or steel, PVC powder or hollow spheres;

fibers, especially glass fibers, carbon fibers, metal fibers, ceramic fibers or plastic fibers like polyamide fibers or polyethylene fibers;

pigments, such as titanium dioxide and iron oxides;

the aforementioned accelerators;

rheology modifiers, such as in particular thickening agents, for example, sheet silicates like bentonites, derivatives of ricin oil, hydrogenated ricin oil, polyamides, polyurethanes, urea compounds, pyrogenic silicic acids, cellulose ether and hydrophobically modified polyoxyethylenes;

adhesion promoters such as organoalkoxysilanes like aminosilanes, mercaptosilanes, epoxysilanes, vinylsilanes, (meth)acrylosilanes, isocyanatosilanes, carbamatosilanes, alkylsilanes, S-(alkylcarbonyl)-mercaptosilanes and aldiminosilanes, as well as oligomeric forms of these silanes, especially 3-glycidoxypropyltrimethoxysilane, 3-am inopropyltrimethoxysilane, N-(2-aminoethyl)-3-aminopropyl-trimethoxysilane, N-(2-aminoethyl)-N'-[3-(trimethoxysilyl)propyl]ethylene diamine, 3-mercaptopropyltrimethoxysilane, 3-isocyanatopropyltrimethoxysilane, 3-ureidopropyltrimethoxysilane, 3-chloropropyltrimethoxysilane, vinyltrimethoxysilane, or the corresponding organosilanes with ethoxy groups instead of the methoxy groups;

stabilizers to oxidation, heat, light and UV radiation;

flame retardants, especially compounds like aluminum hydroxide ($Al(OH)_3$; also known as ATH for "aluminum trihydrate"), magnesium hydroxide ($Mg(OH)_2$; also called MDH for "magnesium dihydrate"), ammonium sulfate (($NH_4)_2SO_4$), boric acid ($B(OH)_3$), zinc borate, zinc phosphate, melamine borate and melamine cyanurate; phosphorus-containing compounds such as ammonium phosphate (($NH_4)_3PO_4$), ammonium polyphosphate, melamine phosphate, melamine pyrophosphate, triphenylphosphate, diphenylcresylphosphate, tricresylphosphate, triethylphosphate, tris-(2-ethylhexyl) phosphate, trioctylphosphate, mono-, bis- and tris-(isopropylphenyl)phosphate, resorcinol-bis (diphenylphosphate), resorcinol-diphosphate oligomer, tetraphenyl-resorcinol-diphosphite, ethylene diamine diphosphate and bisphenol-A-bis(diphenylphosphate); halogen-containing compounds such as chloroalkylphosphates, especially tris-(chloroethyl)phosphate, tris-(chloropropyl)phosphate and tris-(dichloroisopropyl)phosphate, polybrominated diphenylether, especially decabromodiphenylether, polybrominated diphenyloxide, tris-[3-bromo-2,2-bis(bromomethyl)-propyl] phosphate, tetrabromo-bisphenol-A, bis-(2,3-dibromopropyl ether) of bisphenol A, brominated epoxy resins, ethylene-bis(tetrabromophtalimide), ethylene-bis(dibromonorbornane dicarboximide), 1,2-bis-(tribromophenoxy)ethane, tris-(2,3-dibromopropyl)isocyanurate, tribromophenol, hexabromocyclododecane, bis-(hexachlorocyclopentadieno)cyclooctane and chloroparaffins; as well as combinations of a halogen-containing compound and antimony trioxide ($Sb_2O_3$) or antimony pentoxide ($Sb_2O_5$);

surfactants, such as in particular crosslinking agents, leveling agents, deaerating agents or defoamers;

biocides, such as algicides, fungicides or substances inhibiting fungal growth.

Preferably the epoxy resin composition contains further adjuvants and additives, especially crosslinking agents, leveling agents, defoamers, stabilizers, pigments and catalysts, especially salicylic acid or 2,4,6-tris-(dimethylaminomethyl) phenol. Preferably the epoxy resin composition contains little or no content of non-incorporable thinners, especially preferably less than 10 wt. %, especially less than 5 wt. %, and most preferably less than 2 wt. %.

In the epoxy resin composition the ratio of the number of groups reactive to epoxy groups and the number of epoxy groups lies in the range of 0.5:1 to 1.5:1, preferably 0.7:1 to 1.2:1.

The amine hydrogens present in the epoxy resin composition and any other groups present that are reactive to epoxy groups react with the epoxy groups when their ring is opened (addition reaction). As a result of these reactions, the composition is polymerized and finally hardens. The person skilled in the art is aware that primary amino groups are difunctional to epoxy groups and thus a primary amino group counts as two groups that are reactive to epoxy groups.

In particular, the epoxy resin composition is a two-component composition consisting of
(i) a resin component containing at least one epoxy resin and
(ii) a hardener component containing the hardener as described above.

The components of the two-component composition are each kept in their own container. Other ingredients of the two-component epoxy resin composition can be present as an ingredient of the resin or the hardener component, while other ingredients that are reactive to epoxy groups are preferably an ingredient of the hardener component. A suitable container for the storage of the resin or the hardener component is in particular a drum, a hobbock, a bag, a bucket, a can, a cartridge or a tube. The components are storable, that is, they can be kept for several months up to one year or longer before being used, without changing in their respective properties to a relevant degree for their use.

To use the two-component epoxy resin composition, the resin component and the hardener component are mixed together shortly before or during the application. The mix ratio between the two components is preferably chosen such that the groups of the hardener component that are reactive to epoxy groups stand in a suitable relation to the epoxy groups of the resin component, as described above. In parts by weight, the mix ratio between the resin component and the hardener component is normally in the range of 1:10 to 10:1.

The mixing of the two components is done by means of a suitable method; it can be done continuously or in batches. If the mixing occurs prior to the application, one must make sure that not too much time passes between the mixing of the components and the application, since this may lead to disturbances, such as a slower or incomplete buildup of adhesion to the substrate. The mixing is done in particular at ambient temperature, which typically lies in the range of around 5 to 50° C., preferably around 10 to 30° C.

With the mixing of the two components, the hardening begins by chemical reaction, as described above. The hardening occurs in particular at ambient temperature, which typically lies in the range of around 5 to 50° C., preferably around 10 to 30° C. It extends typically over several days to weeks, until it is largely completed under the given conditions. The duration depends on the temperature, the reactivity of the components and their stoichiometry, as well as the presence of accelerators, among other things.

Another subject matter of the invention is thus also a hardened composition obtained from the hardening of an epoxy resin composition, as described in the present document.

The application of the epoxy resin composition is done on at least one substrate, the following ones being especially suitable:

glass, glass ceramics, concrete, mortar, brick, tile, plaster and natural stone like granite or marble;

metals and alloys, like aluminum, iron, steel and nonferrous metals, as well as surface-treated metals and alloys, such as galvanized or chrome-plated metals;

leather, textiles, paper, wood, wood-based materials bound with resins, such as phenol, melamine or epoxy resins, resin-textile composites and other so-called polymer composites;

plastics, such as polyvinylchloride (hard and soft PVC), acrylonitrile-butadiene-styrene copolymers (ABS), polycarbonate (PC), polyamide (PA), polyester, poly(methylmethacrylate) (PMMA), polyester, epoxy resins, polyurethanes (PUR), polyoxymethylene (POM), polyolefins (PO), polyethylene (PE) or polypropylene (PP), ethylene/propylene copolymers (EPM) and ethylene/propylene/diene terpolymers (EPDM), wherein the plastics can be surface-treated preferably by means of plasma, corona or flame;

fiber-reinforced plastics, such as carbon fiber reinforced plastics (CFK), glass fiber reinforced plastics (GFK) and Sheet Moulding Compounds (SMC);

coated substrates, such as powder-coated metals or alloys;

paints and varnishes, especially automobile finishes.

The substrates can be pretreated if necessary before the application of the epoxy resin composition. Such pretreatments include in particular physical and/or chemical cleaning methods, such as grinding, sand blasting, shot peening, brushing or the like, wherein the resulting dust is advantageously suctioned away, as well as further treatment with cleaning agents or solvents or the applying of an adhesion promoter, an adhesion promoting solution, or a primer.

The described epoxy resin composition is advantageously usable as a fiber composite, casting compound, sealant, adhesive, floor covering, coating, paint, varnish, seal, undercoat, primer, foam, block, elastomer, fiber, film or membrane. In particular, it can be used as a casting compound, sealant and adhesive, for example, as an electrical casting compound, sealing compound, surfacer, joint sealant, mounting adhesive, chassis adhesive, sandwich element adhesive, half-shell adhesive, for example for rotor blades of wind power plants, bridge element adhesive, lamination adhesive, or anchoring adhesive, and also as a floor covering, coating, paint, varnish, seal, undercoat and primer for building and industrial applications, especially as a floor covering and floor coating for interior rooms such as offices, industrial bays, gymnasiums or cold storage rooms, or outdoors for balconies, patios, parking roofs, bridges or roofs, as a protective coating for concrete, cement, metals or plastics, for example, for surface sealing of loading areas, tanks, silos, shafts, pipelines, machinery or steel structures, such as those of ships, piers, offshore platforms, sluice gates, hydroelectric stations, waterways, swimming pools, wind power plants, bridges, chimneys, cranes or sheet piling, wherein these coatings protect the particular substrates especially against corrosion, abrasion, moisture, the effects of water and/or salt or chemicals, and also as an undercoat, primer, anticorrosion coat, or for making surfaces waterproof. The described composition is also especially suitable as a coating for so-called heavy corrosion protection in and around water, especially in and around seawater. In particular, when the fully or partly hardened epoxy resin composition is being used as a coating, covering, or paint coat, it is possible to apply another coating, another covering or another paint coat to it, this additional layer also being an epoxy resin composition, or it can also be a different material, in particular, a polyurethane or polyurea coating.

The described epoxy resin composition is especially advantageously usable as a coating. By a coating is meant a layer of any kind that is applied in a sheet, especially paint coats, varnishes, sealants, undercoats and primers, as described above. The described epoxy resin composition is especially advantageously usable in low-emission systems with the Eco Seal of Approval, such as Emicode (EC1 Plus), AgBB, DIBt, Der Blaue Engel, AFSSET, RTS (M1) and US Green Building Council (LEED).

A further subject matter of the invention is thus the use of the described epoxy resin composition as a coating As a coating, the epoxy resin composition is used advantageously in a coating method wherein it has a fluid consistency with low viscosity and good spreading properties, and especially it can be applied as a self-spreading coating on predominantly level surfaces or as a paint coat. Preferably in this application the epoxy resin composition immediately after the mixing of the resin and the hardener component has a viscosity, measured at 20° C., in the range of 300 to 2000 mPa·s, preferably in the range of 300 to 1500 mPa·s, especially in the range of 300 to 1000 mPa·s. The blended composition is applied within the work time as a thin film with a layer thickness of typically around 50 µm to around 5 mm in a sheet on a substrate, typically at ambient temperature. The application is done, for example, by pouring out onto the substrate being coated. The composition in the liquid state is distributed uniformly with the help of a spatula or a trowel, for example. In addition, the composition once spread out can be leveled and freed of air bubbles with a spiked roller. But the application can also be done manually with a brush or roller, or as a spray application, for example, for an anticorrosion coating on steel. Upon hardening, there typically results largely clear, shiny and non-tacky films of high hardness and good resistance, having a good adhesion to the most diverse of substrates. Thanks to the described hardeners, self-spreading epoxy resin coatings are available which make do with little or no non-incorporable thinners, and whose content of primary amino groups can be kept so low that hardly any reactions with the $CO_2$ in the air occur. As a result, for the most part there are no blushing effects for the sheetlike application, even under unfavorable reaction conditions, that is, conditions which favor blushing, especially at low hardening temperatures in the range of 5 to 10° C. and high humidity.

A further subject matter of the invention is an article obtained by using the described epoxy resin composition as a coating.

The described epoxy resin composition is distinguished by numerous advantageous properties. It has only slight odor and is surprisingly fluid at room temperature, so that it can also be easily worked even without additional thinners, especially when applied in a sheet. It hardens at ambient temperature and surprisingly fast, especially also under damp and cold conditions, with no blushing effects, and in the hardened state it has a high hardness and good resistance. Hardened films are typically not cloudy and they have an evenly shiny, crater-free and non-tacky surface. The phenol groups contained in the amino groups of formula (I) exert an accelerating effect on the curing, especially at cooler temperatures in the range of 5 to 10° C., without increasing the viscosity of the composition so much that it would need to be further thinned for better workability. Furthermore, the incorporated phenol groups increase the resistance of the hardened composition, especially with respect to organic acids, such as are contained in food products. The epoxy resin composition is especially surprisingly low-viscosity when it contains at least one amine of formula (V).

EXAMPLES

Sample embodiments are presented below to explain more closely the described invention. Of course, the invention is not limited to these sample embodiments.

1. Description of the Measurement Methods

The amine content, that is, the total content of amino groups in the compounds produced, was determined by titration (with 0.1 N $HClO_4$ in glacial acetic acid, against crystal violet) and it is always indicated in mmol N/g.

Infrared spectra were measured as undiluted films on a Perkin-Elmer FT-IR 1600 instrument outfitted with horizontal ATR measurement unit with ZnSe crystal; the absorption bands are indicated in wave numbers ($cm^{-1}$) (measurement window: 4000-650 $cm^{-1}$).

The viscosities were measured on a thermostatically controlled cone and plate viscosimeter Rheotec RC30 (cone diameter 50 mm, cone angle 1°, distance from cone tip to plate 0.05 mm, shear rate 10-100 s$^{-1}$).

2. Substances Used and their Abbreviations:

TETA triethylene tetramine (techn. grade, amine content around 25.7 mmol N/g)

N4-Amine N,N'-bis(3-aminopropyl)ethylene diamine (from BASF)

IPDA 1-amino-3-aminomethyl-3,5,5-trimethylcyclohexane (=isophorone diamine)

MXDA 1,3-bis-(aminomethyl)benzene (=m-xylylene diamine)

D-230 polypropylene glycol diamine, mean molecular weight around 240 g/mol, amine content around 8.29 mmol N/g (Jeffamine® D-230 from Huntsman)

3. General Preparation for the Reductive Alkylation:

In a round-bottom flask, an aldehyde or a mixture of aldehydes and an amine was dissolved in sufficient isopropanol under a nitrogen atmosphere. The solution was stirred for 30 minutes at room temperature and then hydrogenated at a hydrogen pressure of 80 bar, a temperature of 80° C. and a flow rate of 3 ml/min on a continuously operating hydrogenation apparatus with Pd/C solid bed catalyst. For control of the reaction, IR spectroscopy was used to determine if the imine band at around 1665 cm$^{-1}$ had vanished. The solution was then concentrated down in a vacuum at 80° C.

4. Preparation of Amines

Amine 1: according to the general preparation protocol for the reductive alkylation, 17.2 g of benzaldehyde and 15.0 g of TETA were reacted. There was obtained a clear, light yellowish oil with a viscosity of 260 mPa·s at 20° C. and an amine content of 13.1 mmol N/g.

Amine 2: according to the general preparation protocol for the reductive alkylation, 19.8 g of salicylic aldehyde (=o-hydroxybenzaldehyde) and 15.0 g of TETA were reacted. There was obtained a clear, yellowish oil with a viscosity of 74,100 mPa·s at 30° C., or. 1000 mPa·s at 60° C., and an amine content of 12.2 mmol N/g.

Amine 3: according to the general preparation protocol for the reductive alkylation, 19.8 g of p-hydroxybenzaldehyde and 15.0 g of TETA were reacted. There was obtained a clear, reddish oil with a viscosity of 4290 mPa·s at 60° C., and an amine content of 12.4 mmol N/g.

Amine 4: according to the general preparation protocol for the reductive alkylation, 21.45 g of 3-hydroxypivaldehyde and 18.40 g of TETA were reacted. There was obtained a clear, light yellowish oil with a viscosity of 930 mPa·s at 20° C. and an amine content of 12.50 mmol N/g.

Amine 5: according to the general preparation protocol for the reductive alkylation, 34.24 g of 2,2-dimethyl-3-(N-morpholino)propanal and 18.41 g of TETA were reacted. There was obtained a clear, light yellowish oil with a viscosity of 900 mPa·s at 20° C. and an amine content of 12.82 mmol N/g.

Amine 6: according to the general preparation protocol for the reductive alkylation, 21.2 g of benzaldehyde and 17.0 g of IPDA were reacted. There was obtained a clear, light yellowish oil with a viscosity of 590 mPa·s at 20° C. and an amine content of 5.8 mmol N/g.

Amine 7: according to the general preparation protocol for the reductive alkylation, 24.4 g of salicylic aldehyde and 17.0 g of IPDA were reacted. There was obtained a clear, yellowish, highly viscous substance, glasslike at room temperature, with a viscosity of 111,410 mPa·s at 60° C. and an amine content of 5.2 mmol N/g.

Amine 8: according to the general preparation protocol for the reductive alkylation, 21.2 g of benzaldehyde and 13.6 g of MXDA were reacted. There was obtained a clear, light yellowish oil with a viscosity of 230 mPa·s at 20° C. and an amine content of 6.4 mmol N/g.

Amine 9: according to the general preparation protocol for the reductive alkylation, 24.4 g of salicylic aldehyde and 13.6 g of MXDA were reacted. There was obtained a clear, yellowish oil with a viscosity of 800 mPa·s at 60° C. and an amine content of 5.4 mmol N/g.

Amine 10: according to the general preparation protocol for the reductive alkylation, 30.4 g of vanillin (=4-hydroxy-2-methoxybenzaldehyde) and 13.6 g of MXDA were reacted. There was obtained a clear, orange oil with a viscosity of 62,380 mPa·s at 60° C. and an amine content of 5.0 mmol N/g.

Amine 11: according to the general preparation protocol for the reductive alkylation, 21.2 g of benzaldehyde and 24.0 g of Jeffamine® D-230 were reacted. There was obtained a clear, light yellowish oil with a viscosity of 450 mPa·s at 20° C. and an amine content of 4.7 mmol N/g.

Amine 12: according to the general preparation protocol for the reductive alkylation, 23.6 g of salicylic aldehyde and 24.0 g of Jeffamine® D-230 were reacted. There was obtained a clear, yellowish oil with a viscosity of 6670 mPa·s at 20° C. and an amine content of 4.4 mmol N/g.

Amine 13: according to the general preparation protocol for the reductive alkylation, 23.6 g of p-hydroxybenzaldehyde and 24.0 g of Jeffamine® D-230 were reacted. There was obtained a clear, yellowish oil with a viscosity of 60,100 mPa·s at 20° C. and an amine content of 3.7 mmol N/g.

TABLE 1

Viscosities of amines 1 to 13.

| | Basic amine | Aldehyde | Viscosity [mPa · s] |
|---|---|---|---|
| Amine 1 | TETA | benzaldehyde | 260 (20° C.) |
| Amine 2 | TETA | salicylic aldehyde | 1'000 (60° C.) |
| Amine 3 | TETA | p-hydroxybenzaldehyde | 4'290 (60° C.) |
| Amine 4 | TETA | 3-hydroxypivalic aldehyde | 930 (20° C.) |
| Amine 5 | TETA | 2,2-dimethyl-3-(N-morpholino)propanal | 900 (20° C.) |
| Amine 6 | IPDA | benzaldehyde | 590 (20° C.) |
| Amine 7 | IPDA | salicylic aldehyde | 111,410 (60° C.) |
| Amine 8 | MXDA | benzaldehyde | 230 (20° C.) |
| Amine 9 | MXDA | salicylic aldehyde | 800 (60° C.) |
| Amine 10 | MXDA | vanillin | 62,380 (60° C.) |
| Amine 11 | D-230 | benzaldehyde | 450 (20° C.) |
| Amine 12 | D-230 | salicylic aldehyde | 6670 (20° C.) |
| Amine 13 | D-230 | p-hydroxybenzaldehyde | 60,100 (20° C.) |

5. Preparation of Hardeners

Example 1

73.35 parts by weight (wt. parts) of amine 1 and 8.65 wt. parts of amine 2 were mixed with the aid of a centrifugal mixer (SpeedMixer™ DAC 150, FlackTek Inc.).

Example 2 according to the general preparation protocol for the reductive alkylation, 15.28 g of benzaldehyde, 1.95 g of salicylic aldehyde and 15.00 g of TETA were reacted. There was obtained a clear, yellowish oil with a viscosity of 300 mPa·s at 20° C. and an amine content of 12.11 mmol N/g.

Example 3 as described in example 1, 65.20 wt. parts of amine 1 and 17.90 wt. parts of amine 2 were mixed.

Example 4 according to the general preparation protocol for the reductive alkylation, 13.58 g of benzaldehyde, 3.91 g of salicylic aldehyde and 15.00 g of TETA were reacted. There was obtained a clear, yellowish oil with a viscosity of 520 mPa·s at 20° C. and an amine content of 12.71 mmol N/g.

Example 5 as described in example 1, 57.05 wt. parts of amine 1 and 26.86 wt. parts of amine 2 were mixed.

Example 6 according to the general preparation protocol for the reductive alkylation, 11.89 g of benzaldehyde, 5.86 g of salicylic aldehyde and 15.00 g of TETA were reacted. There was obtained a clear, yellowish oil with a viscosity of 1300 mPa·s at 20° C. and an amine content of 12.58 mmol N/g.

Example 7 as described in example 1, 40.80 wt. parts of amine 1 and 44.80 wt. parts of amine 2 were mixed.

Example 8 as described in example 1, 63.60 wt. parts of amine 4 and 17.90 wt. parts of amine 2 were mixed.

Example 9 as described in example 1, 91.40 wt. parts of amine 5 and 17.90 wt. parts of amine 2 were mixed.

Example 10 according to the general preparation protocol for the reductive alkylation, 16.42 g of benzaldehyde, 2.10 g of salicylic aldehyde and 15.00 g of N4-Amine were reacted. There was obtained a clear, yellowish oil with a viscosity of 300 mPa·s at 20° C. and an amine content of 10.52 mmol N/g.

Example 11 according to the general preparation protocol for the reductive alkylation, 14.60 g of benzaldehyde, 4.20 g of salicylic aldehyde and 15.00 g of N4-Amine were reacted. There was obtained a clear, yellowish oil with a viscosity of 530 mPa·s at 20° C. and an amine content of 11.23 mmol N/g.

Example 12 according to the general preparation protocol for the reductive alkylation, 19.10 g of benzaldehyde, 2.40 g of salicylic aldehyde and 17.03 g of IPDA were reacted. There was obtained a clear, yellowish oil with a viscosity of 1710 mPa·s at 20° C. and an amine content of 5.77 mmol N/g.

Example 13 according to the general preparation protocol for the reductive alkylation, 16.99 g of benzaldehyde, 4.88 g of salicylic aldehyde and 17.03 g of IPDA were reacted. There was obtained a clear, yellowish oil with a viscosity of 5310 mPa·s at 20° C. and an amine content of 5.57 mmol N/g.

Example 14 as described in example 1, 142.20 wt. parts of amine 8 and 17.40 wt. parts of amine 9 were mixed.

Example 15 according to the general preparation protocol for the reductive alkylation, 19.10 g of benzaldehyde, 2.44 g of salicylic aldehyde and 13.61 g of MXDA were reacted. There was obtained a clear, yellowish oil with a viscosity of 320 mPa·s at 20° C. and an amine content of 6.26 mmol N/g.

Example 16 as described in example 1, 126.40 wt. parts of amine 8 and 34.80 wt. parts of amine 9 were mixed.

Example 17 according to the general preparation protocol for the reductive alkylation, 16.99 g of benzaldehyde, 4.88 g of salicylic aldehyde and 13.61 g of MXDA were reacted. There was obtained a clear, yellowish oil with a viscosity of 550 mPa·s at 20° C. and an amine content of 6.12 mmol N/g.

Example 18 as described in example 1, 105.0 wt. parts of amine 11 and 113.0 wt. parts of amine 12 were mixed.

Example 19 according to the general preparation protocol for the reductive alkylation, 5.30 g of benzaldehyde, 6.10 g of salicylic aldehyde and 12.00 g of Jeffamine® D-230 were reacted. There was obtained a clear, yellowish oil with a viscosity of Er 460 mPa·s at 20° C. and an amine content of 4.69 mmol N/g.

Comparison Example 20 as described in example 1, 105.0 wt. parts of amine 11 and 113.0 wt. parts of amine 13 were mixed.

TABLE 2

Viscosities of the hardeners from examples 1 to 19 and comparison example 20.

| | obtained amine of formula (VIII) | Ratio V1 (:1) | contains an amine of formula (V) | Viscosity (20° C.) [Pa · s] |
|---|---|---|---|---|
| Hardener of example 1 | TETA | 0.11 | no | 0.40 |
| Hardener of example 2 | TETA | 0.11 | yes | 0.30 |
| Hardener of example 3 | TETA | 0.25 | no | 0.59 |
| Hardener of example 4 | TETA | 0.25 | yes | 0.50 |
| Hardener of example 5 | TETA | 0.43 | no | 0.91 |
| Hardener of example 6 | TETA | 0.43 | yes | 0.85 |
| Hardener of example 7 | TETA | 1.0 | no | 4.56 |
| Hardener of example 8 | TETA | 0.25 | no | 2.68 |
| Hardener of example 9 | TETA | 0.25 | no | 1.80 |
| Hardener of example 10 | N4-Amine | 0.11 | yes | 0.30 |

TABLE 2-continued

Viscosities of the hardeners from examples 1 to 19 and comparison example 20.

|  | obtained amine of formula (VIII) | Ratio V1 (:1) | contains an amine of formula (V) | Viscosity (20° C.) [Pa · s] |
|---|---|---|---|---|
| Hardener of example 11 | N4-Amine | 0.25 | yes | 0.53 |
| Hardener of example 12 | IPDA | 0.11 | yes | 1.71 |
| Hardener of example 13 | IPDA | 0.25 | yes | 5.31 |
| Hardener of example 14 | MXDA | 0.11 | no | 0.35 |
| Hardener of example 15 | MXDA | 0.11 | yes | 0.32 |
| Hardener of example 16 | MXDA | 0.25 | no | 0.61 |
| Hardener of example 17 | MXDA | 0.25 | yes | 0.55 |
| Hardener of example 18 | D-230 | 1.0 | no | 0.62 |
| Hardener of example 19 | D-230 | 1.0 | yes | 0.59 |
| Hardener of comp. example 20 | D-230 | 1.0 | no | 2.29 |

6. Preparation of the Epoxy Resin Compositions

Substances used:

Aralditew GY 250 bisphenol-A-diglycidylether;
(Huntsman) epoxy equivalent weight around 187.5 g/Eq Epikote 862 bisphenol-F-diglycidylether;
(Hexion) epoxy equivalent weight around 169 g/Eq Araldite DY-E monoglycidylether of a $C_{12}$ to $C_{14}$ alcohol;
(Huntsman) epoxy equivalent weight around 290 g/Eq Ancamine® K 54 2,4,6-tris-(dimethylaminomethyl)phenol
(Air Products)

Examples and Comparison Examples 21 to 44

For each example, the ingredients indicated in tables 3 to 5 were blended in the indicated amounts (in parts by weight) with the aid of a centrifugal mixer (SpeedMixer™ DAC 150, FlackTek Inc.). Ten minutes after the blending, the viscosity of the compositions was determined each time ("viscosity (10')"). Furthermore, each time a first film was spread onto a glass plate in a layer thickness of 500 μm and kept at 23±1° C. and 50±5% relative humidity (=standardized climate, hereinafter abbreviated as "NK"), or hardened. After 4 weeks, the aspect of the films was judged (indicated in the tables as "Aspect (NK)"). A film was judged "good" if it was clear and had a shiny and nontacky surface without structure. By "structure" is meant any kind of marking or pattern on the surface. Furthermore, the König hardness (pendulum hardness after König, measured per DIN EN ISO 1522) of the films was determined after 2 days ("König hardness (NK) (2d)") and after 4 days ("König hardness (NK) (4d)") and after 7 days ("König hardness (NK) (7d)") and after 4 weeks ("König hardness (NK) (4w)"). Furthermore, each time a second film was spread onto a glass plate in a layer thickness of 500 μm and this was kept immediately after the application for 7 days at 8° C. and 80% relative humidity and then for 3 weeks in the NK, or hardened. After this, the aspect of these films was judged (indicated in the tables as "Aspect (8°/80%)"), in the same way as described for the Aspect (NK). Once again, the König hardness was determined for these hardened films, each time after 7 days at 8° C. and 80% relative humidity ("König h. (8°/80%) (7d cold)"), then after another 4 days in the NK ("König h. (8°/80%) (+4d NK)") and 7 days in the NK ("König h. (8°/80%) (+7d NK)") and 3 weeks in the NK ("König h. (8°/80%) (+3w NK)").

The results are indicated in tables 3 to 5.

TABLE 3

Composition and properties of examples 21 to 23, 26 and comparison examples 24, 25, 27 and 28.

| | | Example | | | | | | | |
|---|---|---|---|---|---|---|---|---|---|
| | | 21 | 22 | 23 | 24 (comp.) | 25 (comp.) | 26 | 27 (comp.) | 28 (comp.) |
| Araldite ® GY-250 | | 111.0 | 111.0 | 111.0 | 111.0 | 111.0 | 167.2 | 167.2 | 167.2 |
| Epikote ® 862 | | 50.2 | 50.2 | 50.2 | 50.2 | 50.2 | — | — | — |
| Araldite ® DY-E | | 31.8 | 31.8 | 31.8 | 31.8 | 31.8 | 31.8 | 31.8 | 31.8 |
| Hardener of example 2 | | 82.4 | — | — | — | — | — | — | — |
| Hardener of example 3 | | — | — | — | — | — | 83.2 | — | — |
| Hardener of example 4 | | — | 83.2 | — | — | — | — | — | — |
| Hardener of example 6 | | — | — | 84.0 | — | — | — | — | — |
| Amine 1 | | — | — | — | 81.6 | — | — | 81.6 | — |
| Amine 2 | | — | — | — | — | 89.6 | — | — | 89.6 |
| Ancamine ® K 54 | | 5.5 | 5.5 | 5.5 | 5.5 | 5.6 | 5.5 | 5.6 | 5.8 |
| Visc. (10') [Pa · s] | | 0.40 | 0.46 | 0.66 | 0.37 | 2.59 | 0.90 | 0.49 | 5.36 |
| König h. [s] | (2 d) | 104 | 151 | 157 | 60 | 192 | 143 | 126 | 173 |
| (NK) | (4 d) | 120 | 168 | 174 | 112 | 202 | 175 | 161 | 188 |
| | (7 d) | 155 | 174 | 181 | 145 | 207 | 176 | 176 | 217 |
| | (4 w) | 174 | 180 | 188 | 165 | 207 | 187 | 193 | 218 |
| Aspect (NK) | | good | good | good | good | good | good | good | good |
| König h. | (7 d cold) | 74 | 101 | 104 | 21 | 147 | 112 | 95 | 148 |
| [s] | (+4 d NK) | 153 | 165 | 172 | 82 | 189 | 153 | 145 | 203 |
| (8°/80%) | (+7 d NK) | 168 | 188 | 188 | 105 | 195 | 188 | 154 | 209 |
| | (+3 w NK) | 172 | 192 | 196 | 168 | 205 | 190 | 184 | 196 |
| Aspect (8°/80%) | | good | good | good | good | good | good | good | good |

"König h." stands for "König hardness"; "comp." stands for "comparison"

TABLE 4

Composition and properties of examples 29 to 31, 33 and 34 and comparison examples 32 and 35.

| | | | | example | | | | |
|---|---|---|---|---|---|---|---|---|
| | | 29 | 30 | 31 | 32 (comp.) | 33 | 34 | 35 (comp.) |
| Araldite ® GY-250 | | 167.2 | 167.2 | 167.2 | 167.2 | 167.2 | 167.2 | 167.2 |
| Araldite ® DY-E | | 31.8 | 31.8 | 31.8 | 31.8 | 31.8 | 31.8 | 31.8 |
| Hardener of example 10 | | 89.2 | — | — | — | — | — | — |
| Hardener of example 11 | | — | 89.8 | — | — | — | — | — |
| Hardener of example 12 | | — | — | 178.5 | — | — | — | — |
| Hardener of example 15 | | — | — | — | — | 159.4 | — | — |
| Hardener of example 17 | | — | — | — | — | — | 160.6 | — |
| Amine 6 | | — | — | — | 175.3 | — | — | — |
| Amine 7 | | — | — | — | — | — | — | 158.2 |
| Ancamine ® K 54 | | 5.8 | 5.8 | 7.6 | 7.5 | 7.2 | 7.2 | 7.1 |
| Visc. (10') [Pa · s] | | 0.56 | 0.67 | 1.39 | 1.0 | 0.48 | 0.53 | 0.34 |
| König hardness [s] | (2 d) | 148 | 155 | n.m. | n.m. | 67 | 104 | 27 |
| (NK) | (4 d) | 181 | 182 | 69 | n.m. | 125 | 154 | 108 |
| | (7 d) | 195 | 196 | 141 | 62 | 147 | 165 | 146 |
| | (4 w) | 209 | 209 | 206 | 139 | 169 | 189 | 154 |
| Aspect (NK) | | good | good | good | good | good | good | good |
| König hardness | (7 d cold) | 108 | 111 | 18 | n.m. | 60 | 77 | 6 |
| [s] | (+4 d NK) | 160 | 176 | 129 | 87 | 134 | 159 | 78 |
| (8°/80%) | (+7 d NK) | 176 | 183 | 162 | 126 | 161 | 161 | 161 |
| | (+3 w NK) | 181 | 186 | 193 | 165 | 169 | 175 | 169 |
| Aspect (8°/80%) | | good | good | good | good | good | good | good |

"n.m." stands for "not measurable" (tacky), "comp." stands for "comparison"

TABLE 5

Composition and properties of examples 36, 37, 41 and 43 and comparison examples 38 to 40, 42 and 44.

| | | Example | | | | | | | | |
|---|---|---|---|---|---|---|---|---|---|---|
| | | 36 | 37 | 38 (comp) | 39 (comp) | 40 (comp) | 41 | 42 (comp) | 43 | 44 (comp) |
| Araldite ® GY-250 | | 167.2 | 167.2 | 167.2 | 167.2 | 167.2 | 167.2 | 167.2 | 167.2 | 167.2 |
| Araldite ® DY-E | | 31.8 | 31.8 | 31.8 | 31.8 | 31.8 | 31.8 | 31.8 | 31.8 | 31.8 |
| IPDA | | 28.3 | 28.3 | 28.3 | 28.3 | 28.3 | — | — | — | — |
| Hardener of example 18 | | 72.7 | — | — | — | — | — | — | — | — |
| Hardener of example 19 | | — | 72.7 | — | — | — | — | — | — | — |
| Amine 11 | | — | — | 70.0 | — | — | — | — | — | — |
| Amine 12 | | — | — | — | 75.3 | — | — | — | — | — |
| Amine 13 | | — | — | — | — | 75.3 | — | — | — | — |
| Hardener of example 8 | | — | — | — | — | — | 81.5 | — | — | — |
| Amine 4 | | — | — | — | — | — | — | 79.6 | — | — |
| Hardener of example 9 | | — | — | — | — | — | — | — | 109.3 | — |
| Amine 5 | | — | — | — | — | — | — | — | — | 114.3 |
| Ancamine ® K 54 | | 6.0 | 6.0 | 6.0 | 6.0 | 6.0 | 5.6 | 5.6 | 6.0 | 6.3 |
| Visc. (10') [Pa · s] | | 0.75 | 0.62 | 0.47 | 1.65 | 5.15 | 1.85 | 1.34 | 1.65 | 1.28 |
| König h. [s] | (2 d) | 40 | 52 | n.b. | 127 | 123 | 126 | 99 | 39 | 17 |
| (NK) | (4 d) | 128 | 152 | 102 | 160 | 162 | 176 | 167 | 39 | 56 |
| | (7 d) | 170 | 193 | 129 | 192 | 182 | 195 | 189 | 133 | 92 |
| | (4 w) | 193 | 202 | 161 | 200 | 190 | 212 | 203 | 165 | 140 |
| Aspect (NK) | | good | good | good | good | good | good | good | good | good |

"n.b." stands for "not determined", "König h." stands for "König hardness"; "comp." stands for "comparison"

The invention claimed is:

1. A hardener suitable for the hardening of epoxy resins, comprising an amine with at least one amino group of formula (I) and an amine with at least one amino group of formula (II),

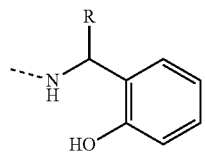

(I)

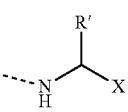

(II)

wherein

R and R' independently of each other stand for a hydrogen atom or an alkyl group with 1 to 12 C atoms; and X stands for a hydrocarbon residue with 1 to 20 C atoms, which optionally has hydroxyl groups, ether groups, ester groups or amino groups;

and wherein the ratio between the number of amino groups of formula (I) and the number of amino groups of formula (II) in the hardener has a value of 0.1:1 to 0.5:1.

2. The hardener according to claim 1, wherein R and R' independently of each other stand for a hydrogen atom or a methyl group.

3. The hardener according to claim 1, wherein X stands for a hydrocarbon residue with 1 to 12 C atoms, which optionally has hydroxyl groups, ether groups or amino groups.

4. The hardener according to claim 3, wherein the hydrocarbon residue stands for an optionally substituted aryl residue with 5 to 12 C atoms.

5. The hardener according to claim 1, wherein X stands for a residue of formula (III),

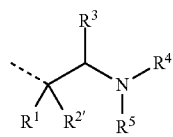

(III)

where $R^1$ and $R^2$ stand, either
independently of each other for a monovalent hydrocarbon residue with 1 to 12 C atoms,
or together for a divalent hydrocarbon residue with 4 to 12 C atoms, which is part of an optionally substituted carbocyclic ring with 5 to 8, C atoms;

$R^3$ stands for hydrogen or an alkyl group or an arylalkyl group or an alkoxycarbonyl group with 1 to 12 C atoms; and either $R^4$ stands for a monovalent aliphatic, cycloaliphatic or arylaliphatic residue with 1 to 20 C atoms, which optionally contains heteroatoms, and $R^5$ stands for hydrogen or for a monovalent aliphatic, cycloaliphatic or arylaliphatic residue with 1 to 20 C atoms, which optionally contains heteroatoms, or $R^4$ and $R^5$ together stand for a divalent aliphatic residue with 3 to 30 C atoms, which is part of an optionally substituted heterocyclic ring with 5 to 8, ring atoms, wherein this ring optionally contains other heteroatoms besides the nitrogen atom.

6. The hardener according to claim 1, wherein X stands for a residue of formula (IV),

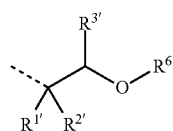

(IV)

where $R^{1'}$ and $R^{2'}$ stand, either
independently of each other for a monovalent hydrocarbon residue with 1 to 12 C atoms,
or together for a divalent hydrocarbon residue with 4 to 12 C atoms, which is part of an optionally substituted carbocyclic ring with 5 to 8, C atoms;

$R^{3'}$ stands for hydrogen or an alkyl group or an arylalkyl group or an alkoxycarbonyl group with 1 to 12 C atoms; and $R^6$ stands for hydrogen or for an alkyl or acyl residue with 1 to 20 C atoms.

7. The hardener according to claim 1, wherein it contains at least one amine of formula (V),

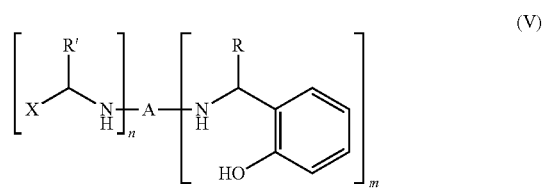

(V)

where

A stands for a (m+n)-valent hydrocarbon residue with a molecular weight in the range of 28 to 5000 g/mol, which optionally has ether groups or amino groups; and m and n each time stand for 1 or 2.

8. The hardener according to claim 7, wherein that A stands for a residue of an amine after removal of the primary amino groups, wherein the amine is chosen from the group consisting of 1,5-diamino-2-methylpentane, 2-butyl-2-ethyl-1,5-pentane diamine, 1,6-hexane diamine, 2,5-dimethyl-1,6-hexane diamine, 2,2,4- and 2,4,4-trimethylhexamethylene diamine, 1,12-dodecane diamine, 1,4-diaminocyclohexane, bis-(4-aminocyclohexyl)methane, bis-(4-amino-3-methylcyclohexyl)methane, 1-amino-3-aminomethyl-3,5,5-trimethylcyclohexane, 1,3-bis-(aminomethyl)cyclohexane, 2,5(2,6)-bis -(aminomethyl)-bicyclo[2.2.1]heptane, 3(4),8 (9)-bis-(aminomethyl)-tricyclo[5.2.1.0$^{2,6}$]decane, 1,3-bis-(aminomethyl)benzene, bis-hexamethylene triamine, diethylene triamine, triethylene -tetramine, tetraethylene pentamine, pentaethylene hexamine, polyethylene polyamine with 5 to 7 ethylene amine units, dipropylene triamine, N-(2-aminoethyl)-1,3-propane diamine, N,N'-bis (3-aminopropyl)ethylene diamine and polyoxyalkylene-diamines and polyoxyalkylene-triamines with a molecular weight of 200 to 500 g/mol.

9. The hardener according to claim 1, wherein it has a viscosity, measured at 20° C., in the range of 150 to 2000 mPa·s.

10. An epoxy resin composition containing
a) at least one epoxy resin, and
b) at least one hardener according to claim 1.

11. The epoxy resin composition according to claim 10, wherein it is a two-component composition consisting of
(i) a resin component containing at least one epoxy resin and
(ii) a hardener component containing the hardener according to one of claims 1 to 9.

12. A hardened composition obtained from the hardening of the epoxy resin composition according to claim 10.

13. A method comprising coating a surface with the epoxy resin composition according to claim 10 as a coating.

14. An article comprising the surface according to claim 13.

* * * * *